US012363467B2

(12) United States Patent
Tracy

(10) Patent No.: US 12,363,467 B2
(45) Date of Patent: Jul. 15, 2025

(54) SPEAKER ASSEMBLY INCLUDING A SPEAKER ARRAY AND A TACTILE EXCITER

(71) Applicant: Dennis A. Tracy, Culver City, CA (US)

(72) Inventor: Dennis A. Tracy, Culver City, CA (US)

( * ) Notice: Subject to any disclaimer, the term of this patent is extended or adjusted under 35 U.S.C. 154(b) by 191 days.

(21) Appl. No.: 18/151,937

(22) Filed: Jan. 9, 2023

(65) Prior Publication Data

US 2023/0353919 A1 Nov. 2, 2023

Related U.S. Application Data

(60) Provisional application No. 63/266,685, filed on Jan. 12, 2022.

(51) Int. Cl.
*H04R 1/02* (2006.01)

(52) U.S. Cl.
CPC ......... *H04R 1/025* (2013.01); *H04R 2499/13* (2013.01)

(58) Field of Classification Search
CPC .................................................. H04R 2499/11
See application file for complete search history.

(56) References Cited

U.S. PATENT DOCUMENTS

2009/0161881 A1* 6/2009 Chen ........................ H04S 3/008 381/18
2009/0168373 A1* 7/2009 Wu ...................... H04R 19/013 361/749
2013/0336495 A1* 12/2013 Burgett ............... A61F 13/2017 381/74
2014/0211945 A1* 7/2014 Norimatsu ................ H04S 7/00 381/17
2016/0358602 A1* 12/2016 Krishnaswamy ....... G10L 15/20
2022/0223061 A1* 7/2022 Watson ................... H04S 7/302

FOREIGN PATENT DOCUMENTS

CN 202455523 U * 9/2012

OTHER PUBLICATIONS

English machine translation of CN-202455523-U (Lu et al,; An Earphone With Vibrator; published Sep. 2012) (Year: 2012).*

* cited by examiner

*Primary Examiner* — Mark Fischer
(74) *Attorney, Agent, or Firm* — Welsh Flaxman & Gitler LLC

(57) ABSTRACT

A speaker assembly is shaped and dimensioned for positioning within an internal cavity defined by a valance panel positioned between a passenger service unit and window of an aircraft. The speaker assembly includes a primary micro-speaker array and a tactile exciter extending from and connected to the primary micro-speaker array via a flexible cable.

20 Claims, 10 Drawing Sheets

SPEAKER ASSEMBLY INCLUDING A SPEAKER ARRAY AND A TACTILE EXCITER

CROSS REFERENCE TO RELATED APPLICATION

This application claims the benefit of U.S. Provisional Patent Application Ser. No. 63/266,685, entitled "SPEAKER ASSEMBLY," filed Jan. 12, 2022, which is incorporated herein by reference.

BACKGROUND OF THE INVENTION

1. Field of the Invention

The invention relates to a speaker assembly. More particularly, the invention relates to a speaker assembly for integration adjacent to a panel of an aircraft.

2. Description of the Related Art

The current global community has made it possible for people all around the country, and around the world, to interact for both business and personal reasons. For many people, this requires they spend considerable time traveling from one location to another location. More often than not, these people travel in aircraft. Whether these people travel in private or commercial aircraft, they desire high quality entertainment during the many hours they spend within the confines of an aircraft. However, while high quality entertainment, for example, digital video with CD quality sound, is readily available for theater and home use, the weight, size and available space requirements for use in aircraft make it very difficult to incorporate high fidelity systems within an aircraft. This problem is especially pronounced for audio loudspeaker assemblies when one attempts to meet the size, weight and shape requirements for use in aircrafts.

In the aircraft industry, great priority is placed upon component weight and size reduction. In addition, spacing and positioning of the loudspeaker assemblies are a great priority to those optimizing the operation of aircraft. The size, weight and shape of conventional terrestrial loudspeaker assembly designs adversely affect range and payload. These concerns are notable when one attempts to make changes within smaller, private jets. For example, a small increase in the weight carried by an aircraft results in a substantial increase in fuel consumption of the aircraft. In addition, the limited space available within an aircraft dictates the use of any space within the aircraft be carefully considered by those responsible for ensuring the comfort of passengers.

A need, therefore, exists for a loudspeaker assembly providing high fidelity sound, while meeting the size, weight and positioning profile requirements of an aircraft. The present invention provides such a loudspeaker assembly.

SUMMARY OF THE INVENTION

It is, therefore, an object of the present invention to provide a speaker assembly shaped and dimensioned for positioning within an internal cavity defined by a valance panel positioned between a passenger service unit and window of an aircraft. The speaker assembly includes a primary micro-speaker array and a tactile exciter extending from and connected to the primary micro-speaker array via a flexible cable.

In some embodiments the primary micro-speaker array includes a speaker housing.

In some embodiments the speaker housing includes a base wall and upwardly extending sidewalls extending from peripheral edges of the base wall.

In some embodiments a top wall of the speaker housing includes a faceplate and opposed lateral top wall members.

In some embodiments the primary micro-speaker array includes first and second micro quasi full-range drivers and a tweeter.

In some embodiments the tactile exciter is connected to the primary micro-speaker array via the flexible cable through which wires connecting the primary micro-speaker array to the tactile exciter pass.

In some embodiments the flexible cable is between approximately 9 inches and 24 inches in length.

In some embodiments the tactile exciter includes a fixedly positioned lower mounting plate assembly that is directly secured to the valance panel and an upper assembly secured to the lower mounting plate assembly in a manner allowing longitudinal movement of the upper assembly relative to the lower mounting plate assembly.

In some embodiments movement of the upper assembly relative to the lower mounting plate assembly allows for adjustment of an exciter voice coil relative to the valance panel and vibration of the exciter voice coil to produce sound as the exciter voice coil acts upon the valence panel.

In some embodiments the upper assembly includes multiple vents to allow for dissipation of heat.

In some embodiments the lower mounting plate assembly includes a mounting plate, the mounting plate is a ring with a central aperture in which the exciter assembly is positioned.

In some embodiments the upper assembly includes a tactile exciter assembly that vibrates the valance panel to create sound, the tactile exciter assembly includes a support frame within which is mounted an exciter body/magnet assembly and moveable exciter voice coil.

In some embodiments a flat panel pressure transducer provides information regarding pressure.

Other objects and advantages of the present invention will become apparent from the following detailed description when viewed in conjunction with the accompanying drawings, which set forth certain embodiments of the invention.

DESCRIPTION OF THE PREFERRED EMBODIMENT

Figure 1:
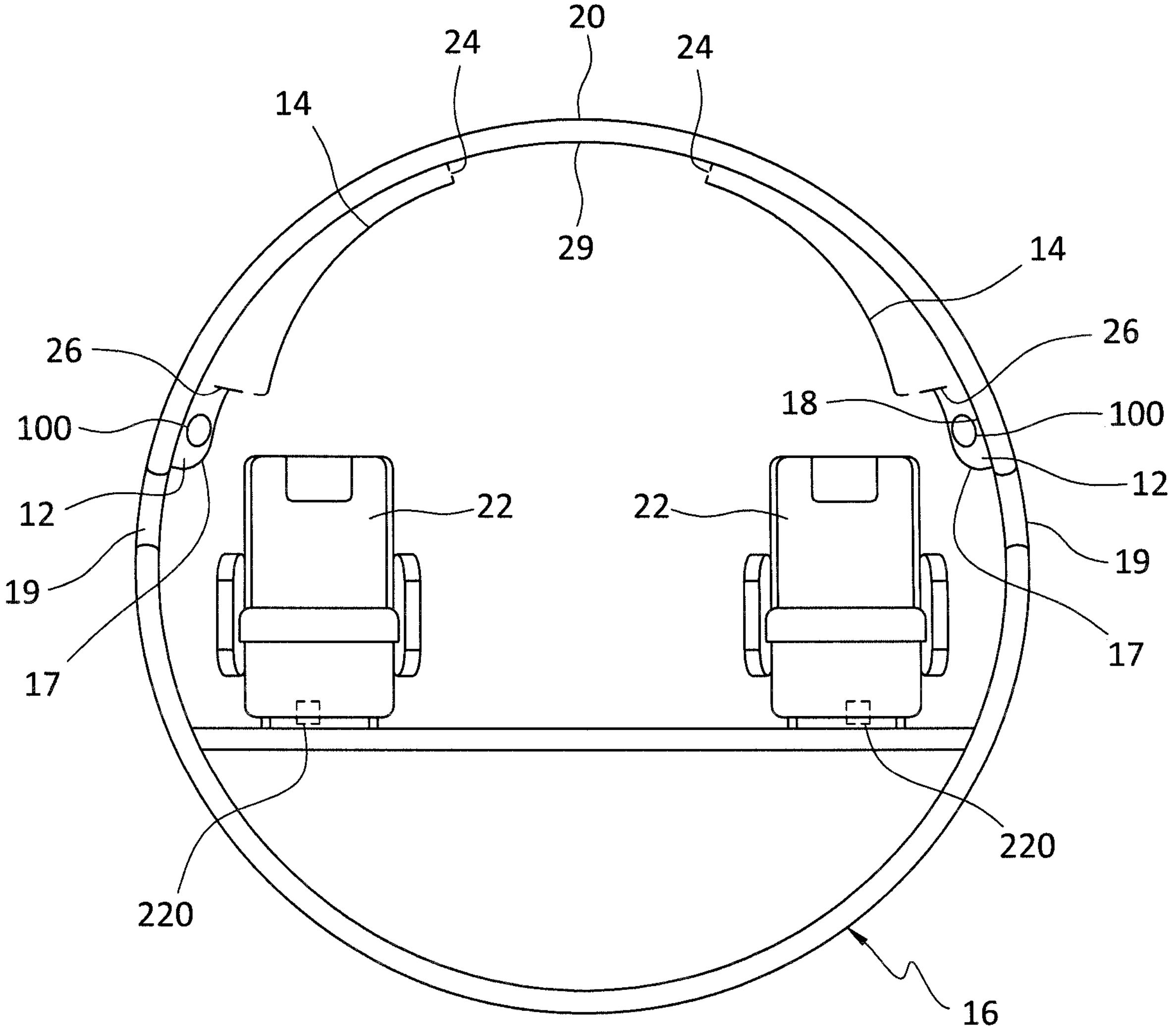
FIG. 1 is a cross-sectional view of an aircraft including the speaker assembly.
Figure 2:
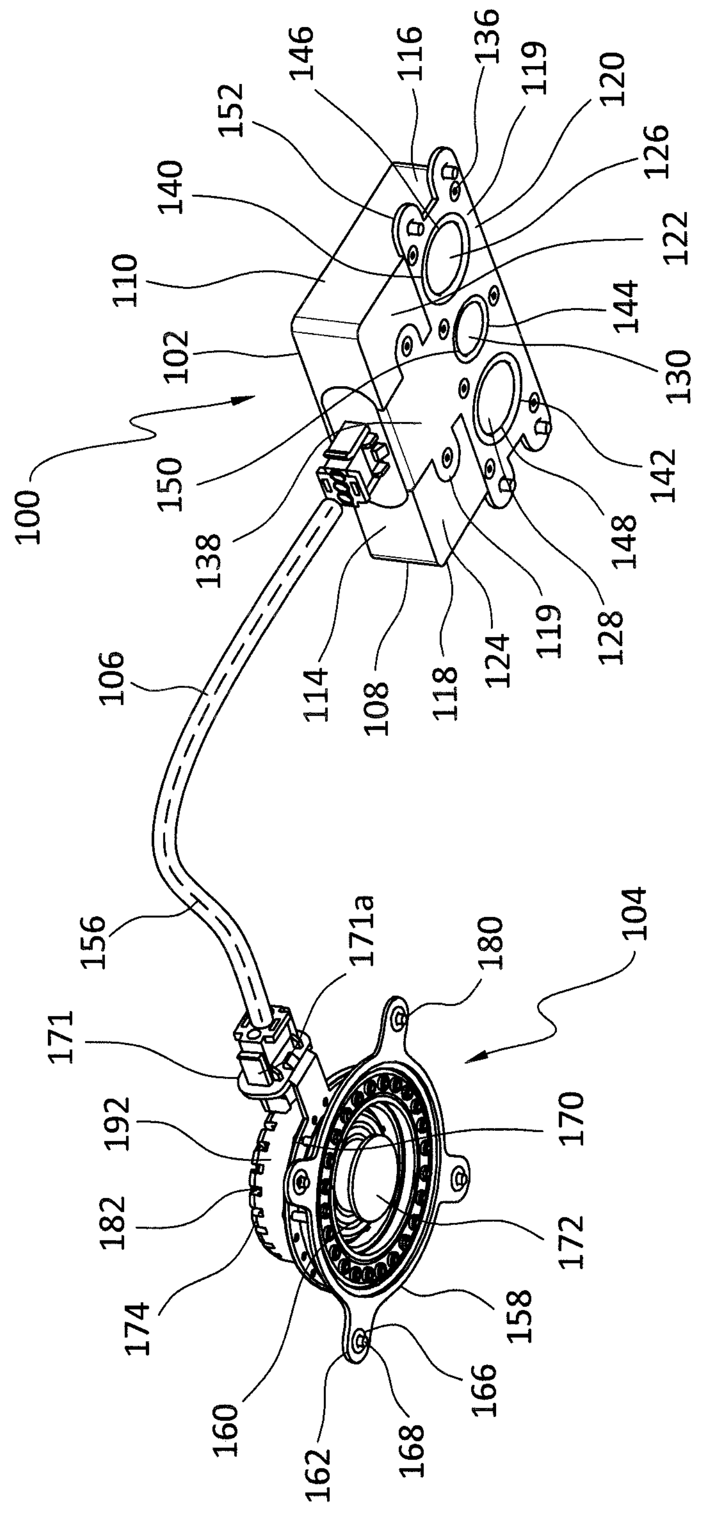
FIG. 2 is a perspective view of the speaker assembly.
Figure 3:
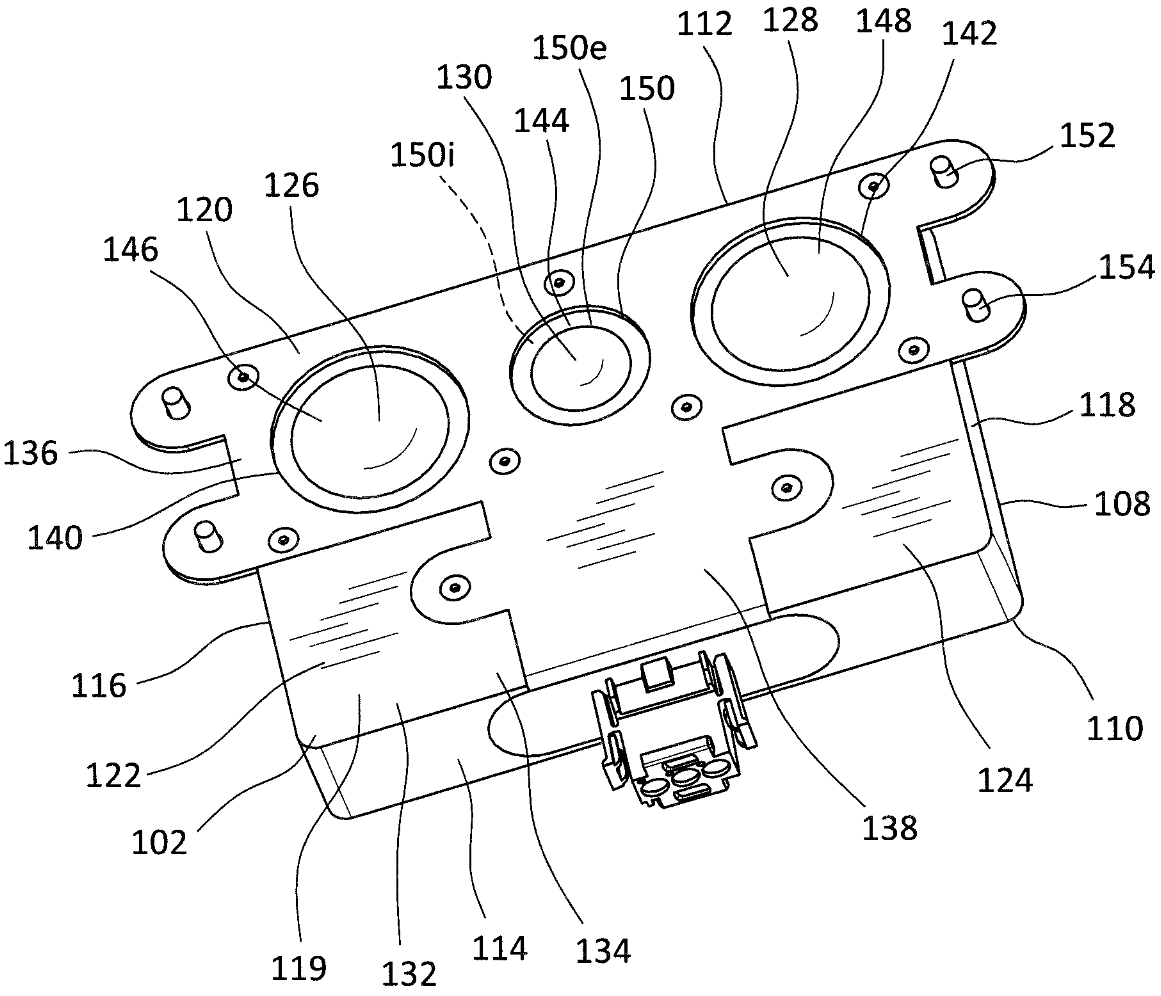
FIGS. 3, 4, and 5 are respectively a first end perspective view, a second end perspective view, and a front elevation view of the primary micro-speaker array.
Figure 4:
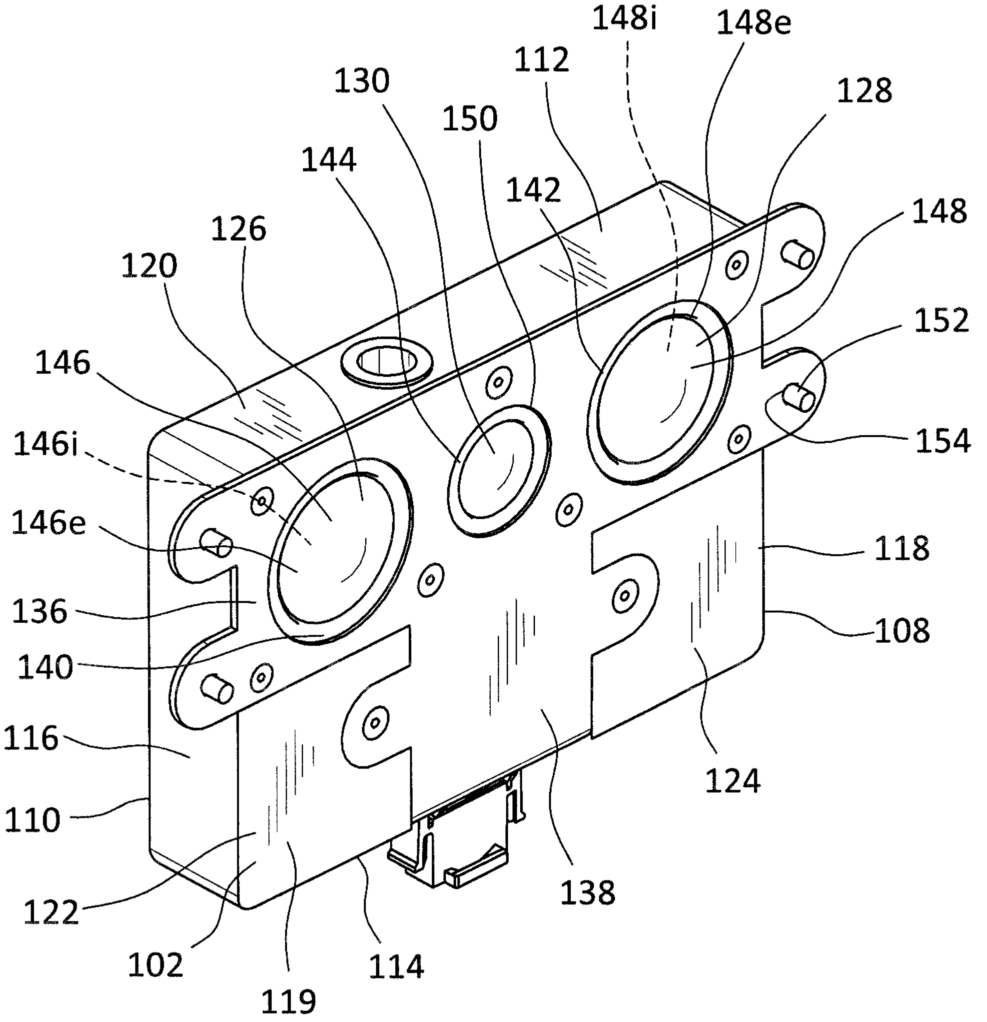
Figure 5:
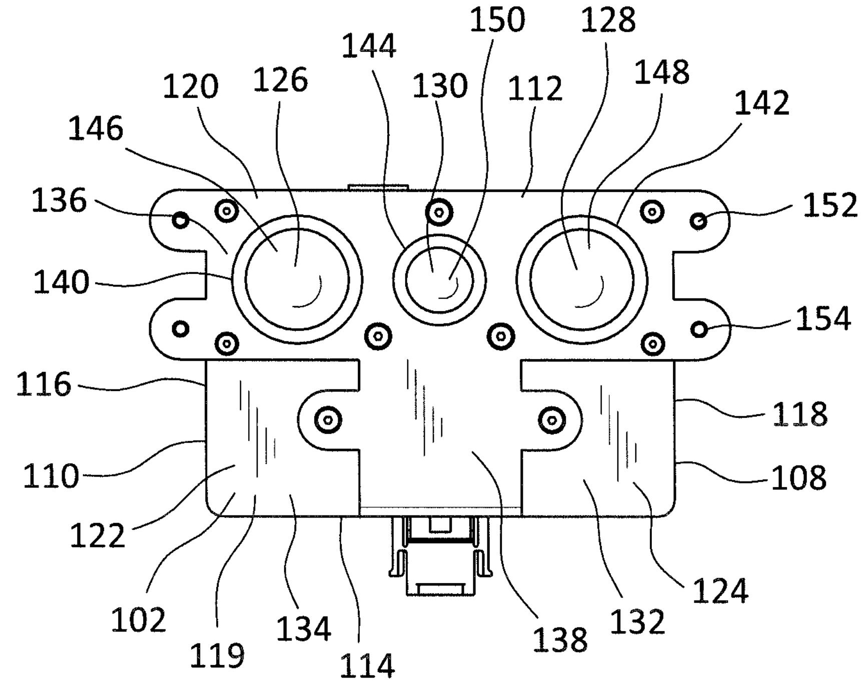
Figure 6:
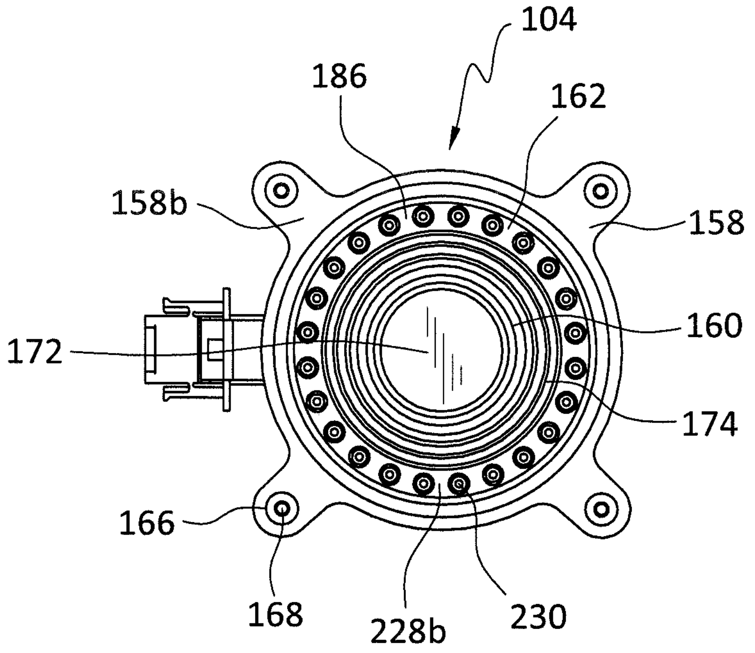
FIG. 6 is a front elevation view of the tactile exciter.
Figure 7:
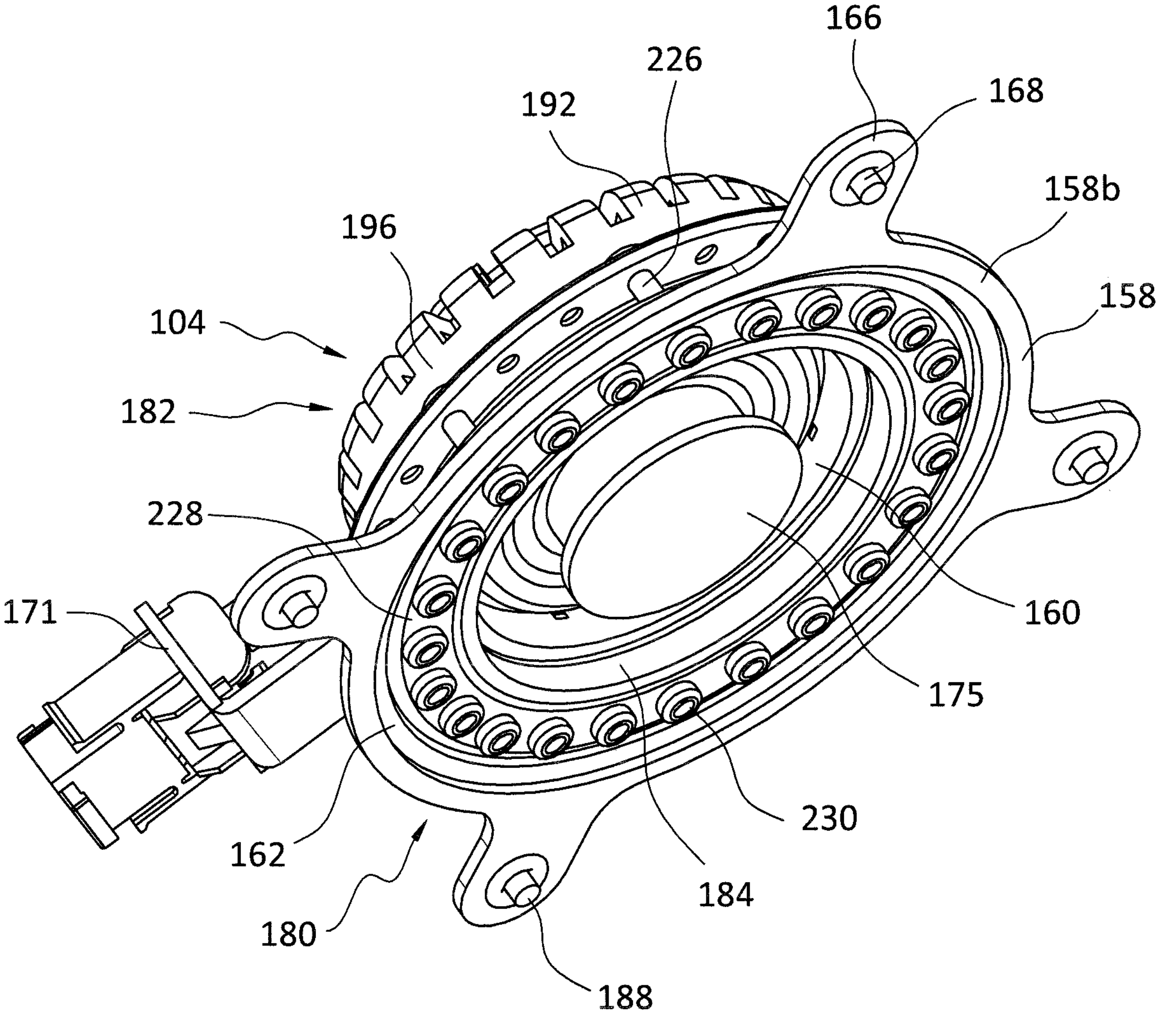
FIGS. 7 and 8 are respectively a top perspective view and a bottom perspective view of the tactile exciter.
Figure 8:
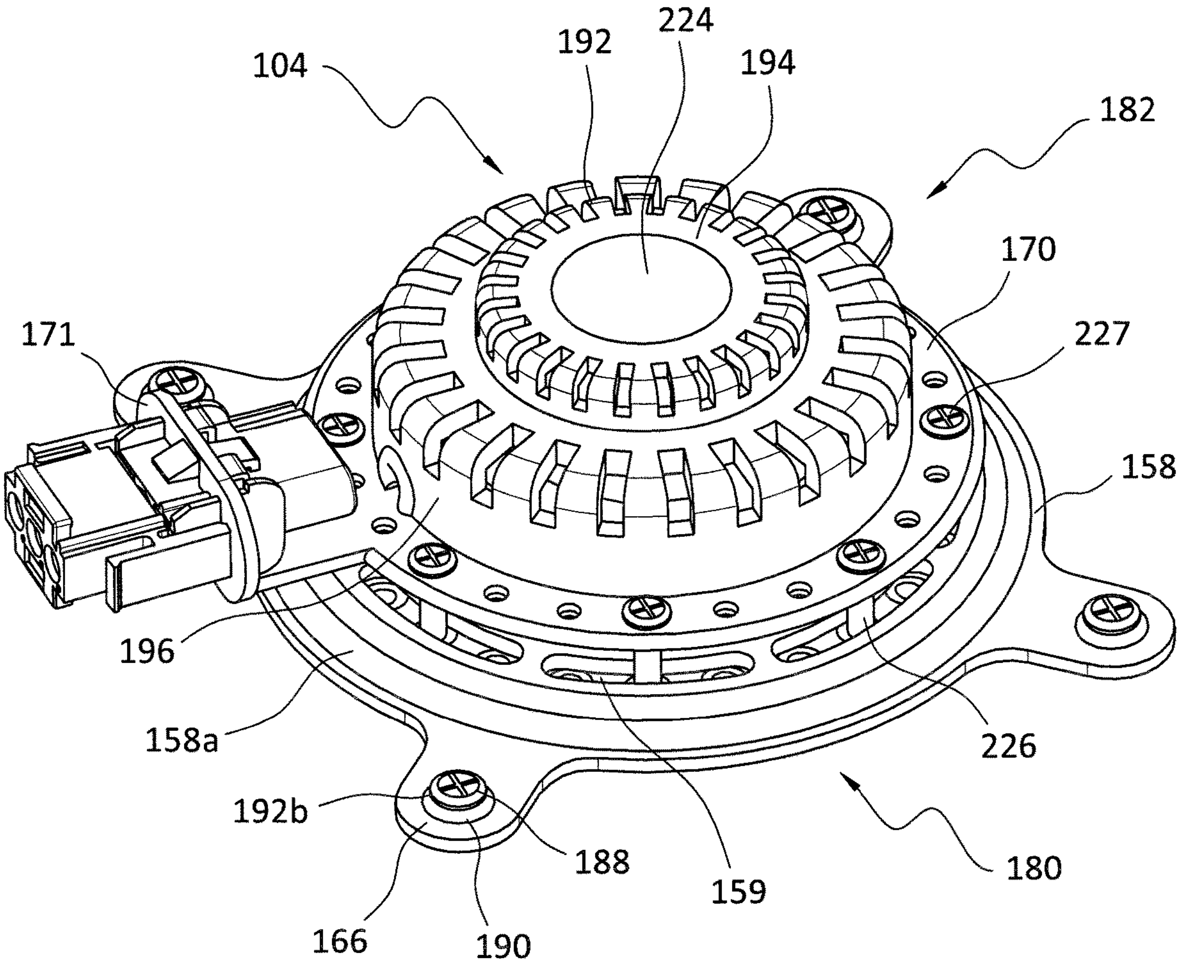
Figure 9:
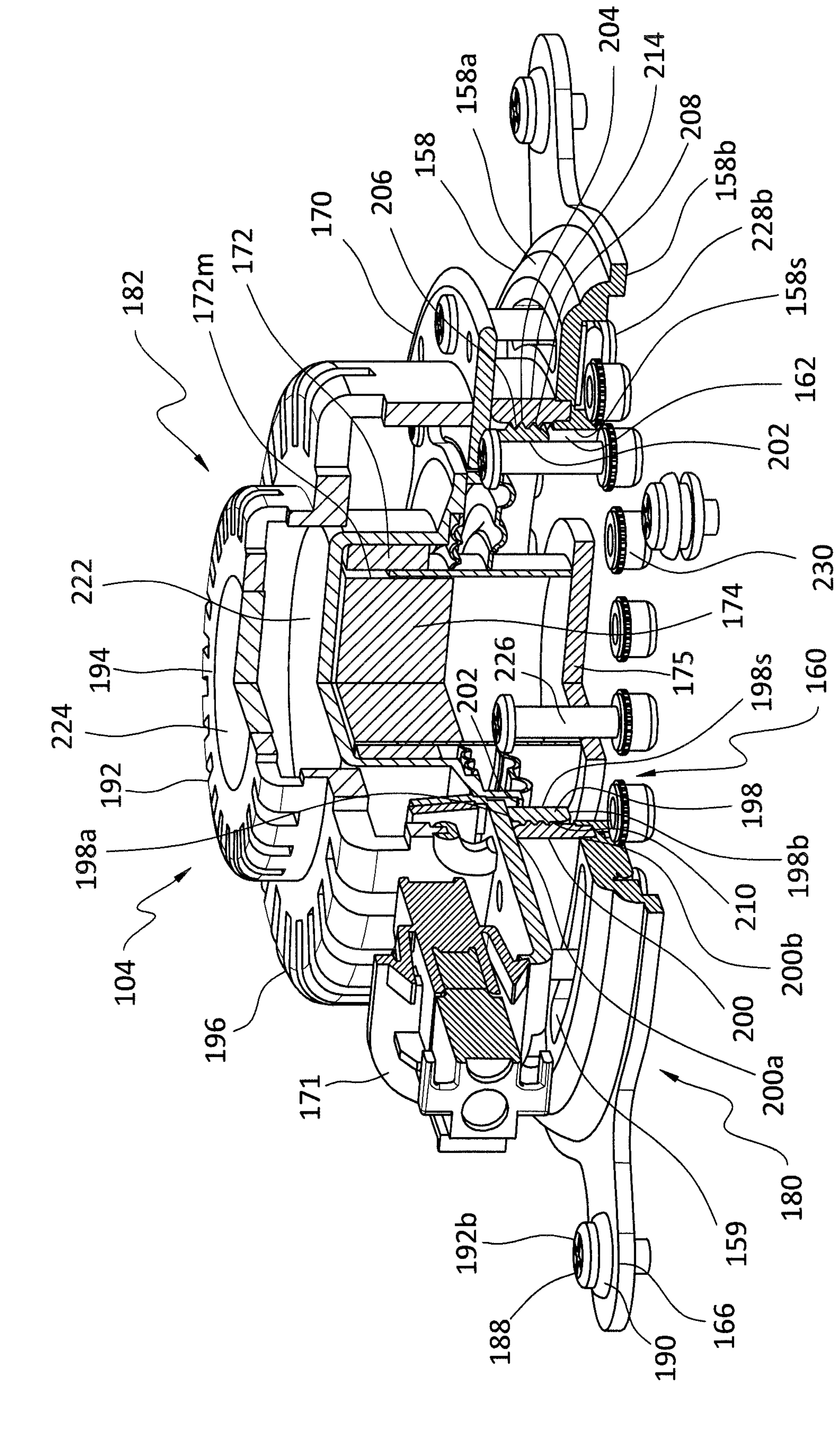
FIGS. 9 and 10 are respectively a side elevation view, partial cross-sectional view and a bottom, partial cross-sectional view of the tactile exciter.
Figure 10:
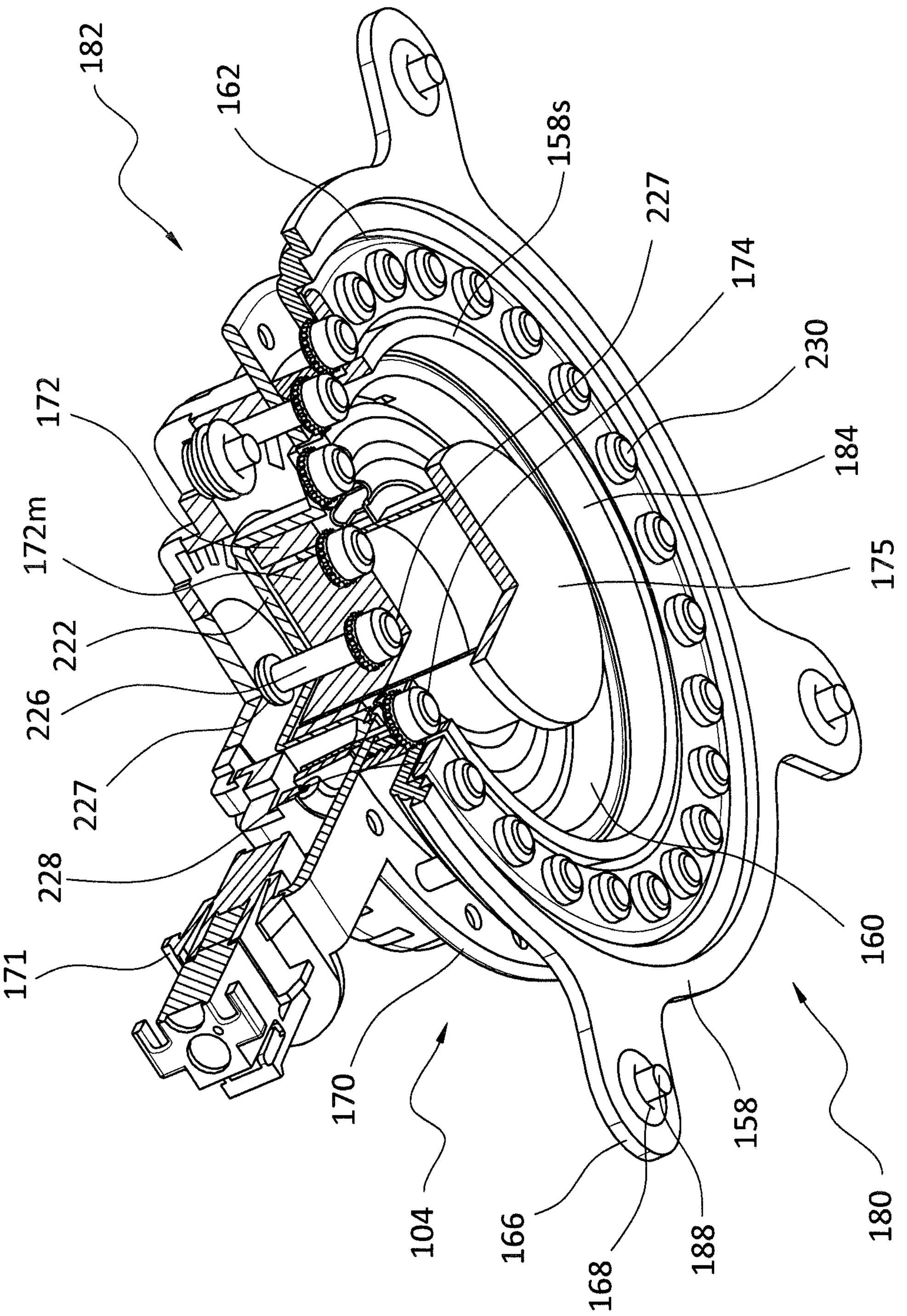

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 to 10, a speaker assembly 100 shaped and dimensioned for positioning within an internal cavity 12 defined by a valance panel 17 positioned between the passenger service unit 14 and window 19 of an aircraft 16 is disclosed. It is however appreciated the speaker assembly may be positioned at various locations within the aircraft 16. For example, it may be used in the ceiling (or headliner) panels, décor panels (that is, those panels on either side of or including the windows), and/or passenger service unit panels.

As will be appreciated by those skilled in the art, a passenger service unit 14 is a structural element of an aircraft 16 in which those accessories providing for passenger comfort and service are positioned. The valance panel 17 is positioned between the passenger service unit 14 and the window 19 in order to provide an aesthetically pleasing interior for the aircraft 16. The passenger service unit 14 and the valance panel are commonly positioned along the interior wall 18 of the aircraft fuselage 20 above the side window and directly above the passenger seat 22 allowing for direct access by passengers sitting in the seats adjacent thereto. The passenger service unit 14 commonly houses air flow devices (for example, an aircraft gasper), lights, public address speakers, messaging buttons for contacting the flight attendants, and various warning lights. In addition, and in accordance with many aircraft designs, the lateral edges 24, 26 of the passenger service unit 14 allow for the creation and transmission of up-wash light and down-wash light. Depending upon the specific aircraft and the custom interior design thereof, the passenger service unit 14 and valance panel 17 may take a variety of shapes.

In particular, the passenger service unit 14 and valance panel 17 extend along the longitudinal axis of the aircraft 16 from the aft of the aircraft 16 to the fore of the aircraft 16. In accordance with the present invention, the internal cavity 12 of the valance panel 17 houses a plurality of speaker assemblies 100 (as described below in detail) along the length of the aircraft 16. The speaker assembly 100 provides a low-profile arrangement minimizing the need for speaker grills along the valance panel.

With reference to FIGS. 1 to 10, the speaker assembly 100 includes a primary micro-speaker array 102 and a tactile exciter 104 extending from and connected to the primary micro-speaker array 102 via a flexible cable 106. In addition to the speaker assembly described herein it is appreciated one or more subwoofers 176 may be used. It should, however, be noted that the subwoofers are never connected to the micro-speaker array or the tactile exciter. The subwoofers are always on their own dedicated low pass amplifier outputs.

The primary micro-speaker array 102 includes a speaker housing 108. The speaker housing 108 is constructed from aluminum and some structures derived by 3D printing, although other materials may be employed without departing from the spirit of the present invention. The speaker housing 108 includes a base wall 110 and four upwardly extending sidewalls 112, 114, 116, 118 extending from the peripheral edges of the base wall 110. As the speaker housing 108 in accordance with a disclosed embodiment is of rectangular shape, the four sidewalls consist of long first and second sidewalls 112, 114 and short third and fourth sidewalls 116, 118.

As will be appreciated based upon the construction and functionality of the present speaker assembly 100 as described herein, the top wall 119 of the speaker housing 108 includes a faceplate 120 and opposed lateral top wall members 122, 124. The construction of the top wall 119 of the speaker housing 108 allows the various drivers 126, 128, 130 (i.e., first and second micro quasi full-range drivers 126, 128 and tweeter 130) to be positioned adjacent to the long first sidewall 112 while the space 132 adjacent to the long second sidewall 114 is left vacant for positioning of cross-over circuitry 134 and other circuitry therein. The space 132 provided adjacent to the long second sidewall 114 also allows for optimal air displacement of the associated first and second micro quasi full-range drivers 126, 128 as they move air in the creation of sound. The tweeter 130 has a sealed back and is not part of the air loading of the enclosure relative to the first and second micro quasi full-range drivers 126, 128.

The faceplate 120 is relatively T-shaped with the length of the top crossbar 136 of the T being approximately the same as the length of the long first and second sidewalls 112, 114 and the length of the bisecting stem 138 of the T being approximately the same as the length of the short third and fourth sidewalls 116, 118. As such, and once the faceplate 120 is secured to the various sidewalls 112, 114, 116, 118, first and second openings remain adjacent to the bisecting stem 138, and these openings are closed off with the opposed lateral top wall members 122, 124.

Along the length of the top crossbar 136 of the faceplate 120, first, second, and third apertures 140, 142, 144 are provided. As is explained below in greater detail, the first and second micro quasi full-range drivers 126, 128 and the tweeter (or high-frequency driver) 130 are respectively secured adjacent to the first, second, and third apertures 140, 142, 144 with the cones 146, 148, 150 driving sound from within the cavity defined by the speaker housing 108, through the respective apertures 140, 142, 144, to the external environment.

Four corner mounts 152 extend laterally from the top of the faceplate 120. Each corner mount 152 includes an aperture 154 adapted for attaching the primary micro-speaker array 102 within the fuselage of an aircraft. The corner mounts 152 attach to SHUR-LOCK® coupling members epoxied into the outboard side of the aircraft décor/valance/ceiling panel.

As briefly mentioned above, the active components of the primary micro-speaker array 102 include first and second micro quasi full-range drivers 126, 128 and a tweeter 130. The active components are mounted within the speaker housing 108 such that the first micro quasi full-range driver 126 is a mirror image of the second micro quasi full-range driver 128, with the tweeter 130 positioned between the first and second micro quasi full-range drivers 126, 128. The tweeter 130 is optionally mounted/positioned slightly above or below the lateral centerline of the first and second micro quasi full-range drivers 126, 128 to minimize the distance separating the first and second micro quasi full-range drivers 126, 128, thus reducing the width/length of the speaker enclosure and associated speaker grill.

The tweeter 130 is a traditional high-frequency driver and includes a cone 150 mounted substantially at the center of the top crossbar 136 of the faceplate 120 in alignment with the third aperture 144. The cone 150 includes an interior surface **150*i* which is directed toward the base wall 110. In this way, sound emitted from the exterior surface 150*e* of the tweeter 130 is directed through the third aperture 144 of the faceplate 120. The tweeter 130 is secured to the faceplate 120** using conventional adhesive.

The first micro quasi full-range driver 126 includes a cone 146 mounted substantially at one end of the top crossbar 136 of the faceplate 120 in alignment with the first aperture 140. The cone 146 includes an interior surface 146*i* which is directed toward the base wall 110. In this way, the sound emitted from the exterior surface 146*e* of the first micro quasi full-range driver 126 is directed through the first aperture 140 of the faceplate 120. The first micro quasi full-range driver 126 is secured to the faceplate 120 using conventional adhesive, and optionally four mounting screws and PEM® nuts per driver.

As with the first micro quasi full-range driver 126, the second micro quasi full-range driver 128 includes a cone 148 mounted substantially at one end of the top crossbar 136 of the faceplate 120 in alignment with the second aperture 142. The cone 148 includes an interior surface 148*i* which is directed toward the base wall 110. In this way, the sound emitted from the exterior surface 148*e* of the second micro quasi full-range driver 128 is directed through the second aperture 142 of the faceplate 120. The second micro quasi full-range driver 128 is secured to the faceplate 120 using conventional adhesive and, optionally, four mounting screws and PEM® nuts per driver.

As mentioned above, the speaker assembly 100 also includes a tactile exciter 104. The tactile exciter 104 is connected to the primary micro-speaker array 102 via a flexible cable 106 through which wires 156 connecting the primary micro-speaker array 102 to the tactile exciter 104 pass. In accordance with a disclosed embodiment, the flexible cable is between approximately 9 inches and 24 inches in length. As those skilled in the art will appreciate, the flexible cable, which terminates to male connector housings with internal contact pins at each end, allows for easy accommodation of a path between the micro-speaker array enclosure and the exciter housing irrespective of any potential interference with existing aircraft structures. While a flexible cable is disclosed herein, it is appreciated other conduits offering similar functionality could be employed.

The tactile exciter (or tactile transducer) 104 includes a fixedly positioned lower mounting plate assembly 180 that is directly secured to the valance panel 17 and an upper assembly 182 secured to the lower mounting plate assembly 180 in a manner allowing longitudinal movement of the upper assembly 182 relative to the lower mounting plate assembly 180. The movement of the upper assembly 182 relative to the lower mounting plate assembly 180 allows for adjustment of the exciter voice coil 174 relative to the valance panel 17 and vibration of the exciter voice coil 174 to produce sound as the exciter voice coil 174 acts upon the panel 17. Additionally, the upper assembly 182 includes multiple vents to allow for the dissipation of heat from the exciter's voice coil assembly and magnet structure and provides sufficient spacing of the driver's moving elements to minimize or prevent direct interference from the aircraft's interior insulation materials The lower mounting plate assembly 180 includes a mounting plate 158. The mounting plate 158 is a ring with a central aperture 162 in which the tactile exciter assembly 160 is positioned. The mounting plate 158 also includes an upper surface 158*a* and a lower surface 158*b*, as well as an interior diameter surface 158*s*. The tactile exciter assembly 160 is secured to the mounting plate 158 via coupling members extending therebetween as will be discussed below in more detail. The mounting plate 158 includes corner mounts 166 extending radially therefrom. Each corner mount 166 includes an aperture 168 adapted for attaching the tactile exciter 104 within the fuselage of an aircraft. The corner mounts 166 attach to a mounting bracket of the aircraft. Further still, the lower mounting plate assembly 180 includes a retaining disc 228 secured along the lower surface 158*b* of the mounting plate 158. In accordance with a disclosed embodiment, resilient washers 190 are optionally positioned between the heads (or opposing faces) 192*h* of the coupling members 188 and the corner mounts 166.

The upper assembly 182 includes a tactile exciter assembly 160 that vibrates the valance panel 17 to create sound. The tactile exciter assembly 160 includes a support frame 170 within which is mounted an exciter body/magnet assembly (or motor assembly) 172 and moveable exciter voice coil 174. The support frame 170 includes a strain relief support member 171 extending therefrom for supporting a female chassis-mount cable connector/socket assembly 171*a* to provide strain relief for the connection of audio/electrical power to the tactile exciter 104.

The upper portion of the tactile exciter assembly 160 is covered by a housing member 192. The housing member 192 includes an upper cover portion 194 from which a downwardly extending sidewall 196 extends to create a domed configuration that fits over the upper portion 222 of the tactile exciter assembly 160.

The exciter body/magnet assembly 172 is fixedly secured to the support frame 170. The voice coil 174 and exciter composite interface disk 175 are secured to the support frame 170 via a suspension system 177 (that is, a spider that is well known to those skilled in the art) and the first ring member 198 (known also as the "surround") in a manner allowing the voice coil 174 and exciter composite interface disk 175 to move relative to the support frame 170 fixedly secured to the support frame 170 and to bring the exciter motor/voice coil assembly back to a neutral/home position when the device is at rest and no electrical signal is applied.

The support frame 170 is directly secured to the mounting plate 158 via the coupling members 164. The exciter body/magnet assembly 172 is mounted for movement relative to the support frame 170 as the voice coil 174 and the magnet 172*m* of the exciter body/magnet assembly 172 interact in a manner known to those skilled in the art.

The suspension system includes a first ring member 198 fixedly secured to the support plate of the support frame 170 and a second ring member 200 fixedly secured to the mounting plate 158 in a manner that prevents rotational movement of the second ring member 200 relative to the mounting plate 158 but permits limited up and down movement of the second ring member 200 relative to the mounting plate 158 to allow for vibration of the moveable exciter voice coil 174 and the exciter composite interface disk 175 extending therefrom.

The first ring member 198 includes an upper edge 198*a* and lower edge 198*b* and a sidewall 198*s* extending between the upper edge 198*a* and the lower edge 198*b*. The sidewall 198*s* includes an inner surface 202 and an outer surface 204. As will be appreciated based upon the following disclosure, the outer surface 204 is threaded 206 for engagement with threading 208 formed along the inner surface 210 of the second ring member 200. The second ring member 200 includes an upper edge 200*a* and lower edge 200*b* and a sidewall 200*s* extending between the upper edge 200*a* and the lower edge 200*b*. The sidewall 200*s* includes an inner surface 210 and an outer surface 214. The inner surface 210 is threaded 208 for engagement with threading 206 formed along the outer surface 204 of the first ring member 198. The lower edge 200*b* of the second ring member 200 is secured to the upper surface 158*a* of the mounting plate 158. By fixedly securing the second ring member 200 to the mounting plate 158 rotational movement of the second ring member 200 relative to the mounting plate 158 is prevented. As a result, this allows one to rotate the first ring member 198 (and ultimately the entire exciter body/magnet assembly (or motor assembly) 172) relative to the second ring member 200 (and ultimately the mounting plate 158) to adjust the position of the voice coil 174 and the exciter composite interface disk 175, attached thereto, up and down.

Engagement of the lower mounting plate assembly 180 with the upper assembly 182 is further facilitated by the provision of connecting bolts 226 extending between the mounting plate 158 and the support frame 170. The connecting bolts 226 are connected to the support frame 170 via their head members 227 and extend through slots 159 in the mounting plate 158. The connecting bolts 226 include locking nuts 230 at their free ends that retain the connecting bolts 226 within the slots 159 of the mounting plate 158 by interacting with the retaining disc 228 and Teflon film 229 positioned between the lower surface 158*b* of the mounting plate 158 and the head members 227. The retaining disc 228 includes openings that allow for the passage of the connecting bolts 226 therethrough, but prevent the passage of the head member 227 therethrough. The connecting bolts 226 are tightened relative to the nuts 230 to hold the assembly in position after the position of the exciter composite interface disk 175 is adjusted as described herein.

The tactile exciter 104 is positioned within the aircraft such that the exciter composite interface disk 175 is in contact with the outboard side of the valance panel 17 (or other panel upon which the tactile exciter is mounted). As such, movement of the exciter composite interface disk 175 resulting from the interaction of the magnet 172*m* with the voice coil 174 is transmitted to the valance panel 17 in a manner causing the valance panel 17 to reproduce the desired sounds. As those skilled in the art will appreciate, the placement (amount/level of compression) of the exciter composite interface disk 175 relative to the valance panel 17 is critical to optimal sound reproduction, and the tactile exciter 104 is therefore provided with the ability to adjust the exciter composite interface disk 175 relative to the mounting plate 158 as discussed above.

Figure 11:
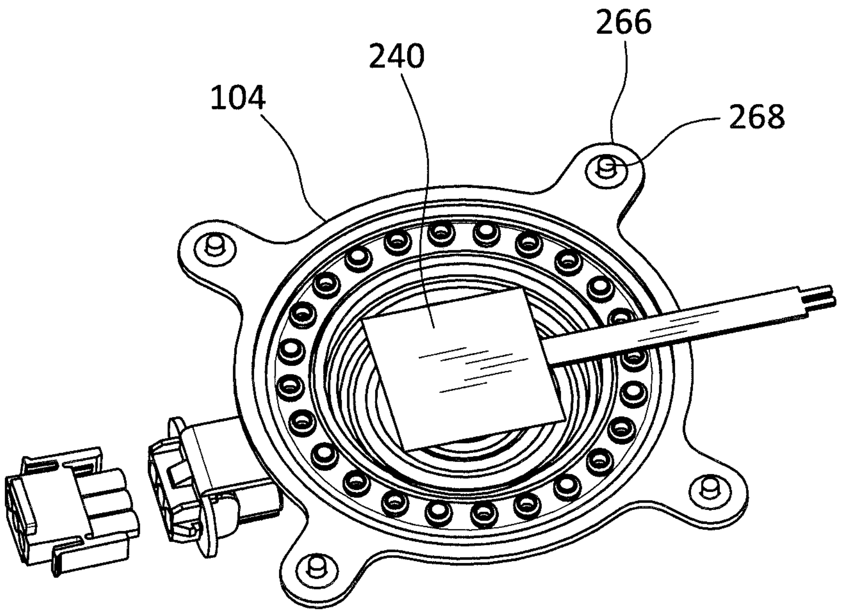
FIG. 11 is a perspective view of the tactile exciter in accordance with an embodiment including a pressure transducer.

In accordance with an embodiment as disclosed with reference to FIG. 11, proper placement of the tactile exciter 104 relative to the panel 17 is facilitated by the provision of a flat panel pressure transducer 240 (control box and display not shown) that is positioned between the exciter composite interface disk 175 (not shown in FIG. 11) and the panel 17 (a film of Teflon (not shown) may be positioned between the exciter composite interface disk 175 and the panel 17). The pressure transducer 240 provides information regarding the pressure between the exciter composite interface disk 175 and the panel 17 and allows one to adjust the tactile exciter 104 relative to the panel 17 as discussed above to optimize the pressure and ultimately the operation of the tactile exciter 104. In practice, and after the pressure between the tactile exciter 104 relative to the panel 17 is adjusted to a desired level, the pressure transducer 240 is left in its position between the tactile exciter 104 and the panel 17.

The speaker assembly 100 typically includes a subwoofer 176 used in the reproduction of very low-frequency sounds. The subwoofer 176 audio output is non-directional and may be located within various proximate structures comprising the aircraft's interior furnishings. Unlike the tactile exciter 104, which in conjunction with the micro quasi full-range speaker array 102, comprises the speaker assembly 100, the optional subwoofer described is not coupled to the primary micro-speaker array 102 via wiring, rather it is powered by a separate amplifier or amplifier channel, the wiring of which is not shown as it is installed using conventional techniques.

As briefly mentioned above, the crossover network of the speaker assembly 100 and other circuitry are housed within the housing of the primary micro-speaker array 102. The primary micro-speaker array 102 is, therefore, connected directly to the audio source and the audio signal is processed by the crossover circuitry 134 of the speaker assembly 100 which then sends appropriate signals to the various drivers. In accordance with a preferred embodiment, it is contemplated frequencies greater than 400 Hz will be reproduced by the first and second micro quasi full-range drivers 126, 128 and the tweeter 130, frequencies between approximately 200 Hz and 3500 Hz will be reproduced by the tactile exciter 104, providing additional power-handling and sound dispersion for the low to upper mid-frequencies, while not compromising the "point source" acoustic benefit of the micro quasi full-range array. Frequencies below 200 Hz will be reproduced by the (notional/optional) subwoofer 176.

Installation of the speaker assembly 100 is completed by mounting the primary micro-speaker array 102 at a desired location along the valance panel 17, with only an aperture and grill formed in the valance panel 17 of a size sufficient to expose the first and second micro quasi full-range drivers 126, 128 and the high-frequency driver 130. The tactile exciter 104 is thereafter positioned in the same panel or any proximate panel, limited only by the length of the supplied interconnection cable. Positioning of the pressure transducer 240 centrally relative to the exciter composite interface disk 175 is achieved by marking locations of the apertures 168 in each corner mount 166, drawing diagonal lines and positioning the pressure transducer at the intersection of the line. Finally, the (notional/optional) woofer module or subwoofer 176 may be positioned where associated cabin/compartment structure space allows.

Through the use of the present speaker assembly 100, the aperture and grill necessary along the valance panel 17 for the transmission of sound to the passenger compartment is drastically reduced. For example, a traditional speaker might require an aperture and grill having ("a revealed area") an area of approximately 24 square inches while the present speaker assembly 100 can achieve the same sound transmission with aperture and grill having an area of less than 9 square inches.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A speaker assembly shaped and dimensioned for positioning within an internal cavity defined by a valance panel positioned between a passenger service unit and window of an aircraft, comprising:

- a speaker array including at least one speaker driver positioned within a speaker housing;
- a tactile exciter extending from and connected to the speaker array via a cable through which wires connecting the speaker array to the tactile exciter pass, the tactile exciter further including a lower mounting plate assembly that is directly secured to the valance panel.

2. The speaker assembly according to claim 1, wherein the speaker array comprises a primary micro-speaker array.

3. The speaker assembly according to claim 2, wherein the speaker housing includes a base wall and upwardly extending sidewalls extending from peripheral edges of the base wall.

4. The speaker assembly according to claim 3, wherein a top wall of the speaker housing includes a faceplate and opposed lateral top wall members.

5. The speaker assembly according to claim 2, wherein the primary micro-speaker array includes first and second micro quasi full-range drivers and a tweeter.

6. The speaker assembly according to claim 5, wherein the cable connecting the tactile exciter to the primary micro-speaker array is a flexible cable.

7. The speaker assembly according to claim 6, wherein the flexible cable is between approximately 9 inches and 24 inches in length.

8. The speaker assembly according to claim 5, wherein the tactile exciter includes an upper assembly secured to the lower mounting plate assembly in a manner allowing longitudinal movement of the upper assembly relative to the lower mounting plate assembly.

9. The speaker assembly according to claim 8, wherein movement of the upper assembly relative to the lower mounting plate assembly allows for adjustment of an exciter voice coil relative to the valance panel and vibration of the exciter voice coil to produce sound as the exciter voice coil acts upon the valence panel.

10. The speaker assembly according to claim 8, wherein the upper assembly includes multiple vents to allow for dissipation of heat.

11. The speaker assembly according to claim 10, wherein the lower mounting plate assembly includes a mounting plate, the mounting plate is a ring with a central aperture in which the exciter assembly is positioned.

12. The speaker assembly according to claim 8, wherein the upper assembly includes a tactile exciter assembly that vibrates the valance panel to create sound, the tactile exciter assembly includes a support frame within which is mounted an exciter body/magnet assembly and moveable exciter voice coil.

13. The speaker assembly according to claim 1, wherein the tactile exciter is connected to the speaker array via the flexible cable through which wires connecting the speaker array to the tactile exciter pass.

14. The speaker assembly according to claim 13, wherein the flexible cable is between approximately 9 inches and 24 inches in length.

15. The speaker assembly according to claim 1, further including a flat panel pressure transducer to provide information regarding pressure.

16. A speaker assembly shaped and dimensioned for positioning within an internal cavity defined by a valance panel positioned between a passenger service unit and window of an aircraft, comprising:

a primary micro-speaker array;

a tactile exciter extending from and connected to the primary micro-speaker array via a flexible cable, wherein the tactile exciter includes a fixedly positioned lower mounting plate assembly that is directly secured to the valance panel and an upper assembly secured to the lower mounting plate assembly in a manner allowing longitudinal movement of the upper assembly relative to the lower mounting plate assembly.

17. The speaker assembly according to claim 16, wherein movement of the upper assembly relative to the lower mounting plate assembly allows for adjustment of an exciter voice coil relative to the valance panel and vibration of the exciter voice coil to produce sound as the exciter voice coil acts upon the valence panel.

18. The speaker assembly according to claim 16, wherein the upper assembly includes multiple vents to allow for dissipation of heat.

19. The speaker assembly according to claim 18, wherein the lower mounting plate assembly includes a mounting plate, the mounting plate is a ring with a central aperture in which the exciter assembly is positioned.

20. The speaker assembly according to claim 16, wherein the upper assembly includes a tactile exciter assembly that vibrates the valance panel to create sound, the tactile exciter assembly includes a support frame within which is mounted an exciter body/magnet assembly and moveable exciter voice coil.

* * * * *